United States Patent
Zhang

(10) Patent No.: US 10,534,697 B2
(45) Date of Patent: Jan. 14, 2020

(54) FLEXIBLE CONFIGURATION FRAMEWORK

(71) Applicant: SAP SE, Walldorf (DE)

(72) Inventor: Wenli Zhang, San Jose, CA (US)

(73) Assignee: SAP SE, Walldorf (DE)

( * ) Notice: Subject to any disclaimer, the term of this patent is extended or adjusted under 35 U.S.C. 154(b) by 207 days.

(21) Appl. No.: 14/924,224

(22) Filed: Oct. 27, 2015

(65) Prior Publication Data

US 2017/0116113 A1    Apr. 27, 2017

(51) Int. Cl.
*G06F 11/36* (2006.01)
*G06F 8/71* (2018.01)

(52) U.S. Cl.
CPC ............ *G06F 11/3688* (2013.01); *G06F 8/71* (2013.01)

(58) Field of Classification Search
CPC .. G06F 7/78; G06F 8/00–78; G06F 9/44–455; G06F 11/36
See application file for complete search history.

(56) References Cited

U.S. PATENT DOCUMENTS

| | | | | |
|---|---|---|---|---|
| 5,781,720 A * | 7/1998 | Parker | ................. | G06F 11/3688 714/38.11 |
| 2003/0097650 A1* | 5/2003 | Bahrs | ................. | G06F 11/3688 717/124 |
| 2008/0114937 A1* | 5/2008 | Reid | ................... | G06F 11/3636 711/117 |
| 2008/0270998 A1* | 10/2008 | Zambrana | ........... | G06F 11/3612 717/131 |
| 2009/0307468 A1* | 12/2009 | Choudhury | ........... | G06F 11/263 712/227 |
| 2012/0311387 A1* | 12/2012 | Santhosh | ............ | G06F 11/3433 714/33 |
| 2014/0040665 A1* | 2/2014 | Aggarwal | ........... | G06F 11/3684 714/27 |
| 2015/0301071 A1* | 10/2015 | Dhan | ................. | G01N 35/0092 702/108 |

OTHER PUBLICATIONS

Wikipedia, "Tree Traversal", http://en.wikipedia.org/wiki/Tree_traversal, Internet Archive dated Apr. 6, 2014 (Year: 2014), pp. 1-7.*

* cited by examiner

*Primary Examiner* — Doon Y Chow
*Assistant Examiner* — Timothy P Duncan
(74) *Attorney, Agent, or Firm* — Lam P. Doan; Fountainhead Law Group P.C.

(57) ABSTRACT

Some embodiments provide a non-transitory machine-readable medium that stores a program executable by at least one processing unit of a device. The program receives a test configuration for performing a set of operations on an application. The test configuration includes a first configuration component having a first type and a second configuration component having a second type. The program also processes the first configuration component with a first configuration component processor. The program further processes the second configuration component with a second configuration component processor. The program also performs the set of operations on the application based on the processing of at least one of the first and second configuration components.

20 Claims, 7 Drawing Sheets

FLEXIBLE CONFIGURATION FRAMEWORK

BACKGROUND

When an application for a computing device is in development, the application is typically tested before released for use by consumers. In some instances, the application is manually tested by a human user in order to identify problems and bugs in the applications. In other cases, the application may be tested by another computing device or application. In such cases, each test that is to be performed by the other computing device or application needs to be coded.

SUMMARY

In some embodiments, a non-transitory machine-readable medium stores a program executable by at least one processing unit of a device. The program receives a test configuration for performing a set of operations on an application. The test configuration includes a first configuration component having a first type and a second configuration component having a second type. The program also processes the first configuration component with a first configuration component processor. The program further processes the second configuration component with a second configuration component processor. The program also performs the set of operations on the application based on the processing of at least one of the first and second configuration components.

In some embodiments, the program further parses the test configuration into an object model representation of the test configuration. The program may also traverse the object model representation of the test configuration to identify configuration components of the test configuration to process. In some embodiments, the program also generates results of the processing of the test configuration.

In some embodiments, the test configuration is a first test configuration and the set of operations is a first set of operations. The program may further receive a second test configuration for performing a second set of operations on the application. The test second configuration includes a third configuration component having the first type and a fourth configuration component having a third type. The program also processes the third configuration component with the first configuration component processor. The program further processes the fourth configuration component with a third configuration component processor. The program also performs the second set of operations on the application based on the processing of at least one of the third and fourth configuration components.

In some embodiments, the test configuration further includes a third configuration component having the first type. The program also processes the third configuration component with the first configuration component processor. Performing the set of operations on the application may be further based on the processing of the third configuration component. In some embodiments, the application provides a graphical user interface (GUI). Performing the set of operations on the application may include performing the set of operations on the application via the GUI.

In some embodiments, a method receives a test configuration for performing a set of operations on an application. The test configuration includes a first configuration component having a first type and a second configuration component having a second type. The method also processes the first configuration component with a first configuration component processor. The method further processes the second configuration component with a second configuration component processor. The method also performs the set of operations on the application based on the processing of at least one of the first and second configuration components.

In some embodiments, the method further parses the test configuration into an object model representation of the test configuration. The method may also traverse the object model representation of the test configuration to identify configuration components of the test configuration to process. In some embodiments, the method also generates results of the processing of the test configuration.

In some embodiments, the test configuration is a first test configuration and the set of operations is a first set of operations. The method further receives a second test configuration for performing a second set of operations on the application. The test second configuration includes a third configuration component having the first type and a fourth configuration component having a third type. The method also processes the third configuration component with the first configuration component processor. The method further processes the fourth configuration component with a third configuration component processor. The method also performs the second set of operations on the application based on the processing of at least one of the third and fourth configuration components.

In some embodiments, the test configuration further includes a third configuration component having the first type. The method may also process the third configuration component with the first configuration component processor. Performing the set of operations on the application is further based on the processing of the third configuration component. In some embodiments, the application provides a graphical user interface (GUI). Performing the set of operations on the application may include performing the set of operations on the application via the GUI.

In some embodiments, a system includes a test configuration manager configured to receive a test configuration for performing a set of operations on an application. The test configuration includes a first configuration component having a first type and a second configuration component having a second type. The system also includes a configuration component processing manager configured to process the first configuration component with a first configuration component processor, process the second configuration component with a second configuration component processor, and perform the set of operations on the application based on the processing of at least one of the first and second configuration components.

In some embodiments, the system further includes a test configuration parser configured to parse the test configuration into an object model representation of the test configuration. The test configuration manager may be further configured to traverse the object model representation of the test configuration to identify configuration components of the test configuration to process. In some embodiments, the test configuration manager is further configured to generate results of the processing of the test configuration.

In some embodiments, the test configuration is a first test configuration and the set of operations is a first set of operations. The test configuration manager may be further configured to receive a second test configuration for performing a second set of operations on the application. The test second configuration includes a third configuration component having the first type and a fourth configuration component having a third type. The configuration component processing manager is may be further configured to process the third configuration component with the first configuration component processor, process the fourth configuration component with a third configuration component processor, and perform the second set of operations on the application based on the processing of at least one of the third and fourth configuration components.

In some embodiments, the test configuration further includes a third configuration component having the first type. The configuration component processing manager may be further configured to process the third configuration component with the first configuration component processor. Performing the set of operations on the application may be further based on the processing of the third configuration component.

The following detailed description and accompanying drawings provide a better understanding of the nature and advantages of the present invention.

DETAILED DESCRIPTION

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Described herein are techniques for processing test configurations to perform tests on an application. In some embodiments, a test configuration is specified by several configuration components. A test configuration may include any number of different types of configuration components. Each type of configuration component is associated with a corresponding configuration component processor. When processing a test configuration, each configuration component is processed by the corresponding configuration component processor. This way, the different types of configuration components and the corresponding configuration component processors may be reused to create different test configurations and process the different test configurations in an automated manner (e.g., without human intervention). In some embodiments, a type of configuration component may be used in the same test configuration and/or across different test configurations. This way, test configurations may be composed quickly and efficiently by reusing con-figuration components. In addition, test configurations may be processed efficiently by reusing configuration component processors.

Figure 1:
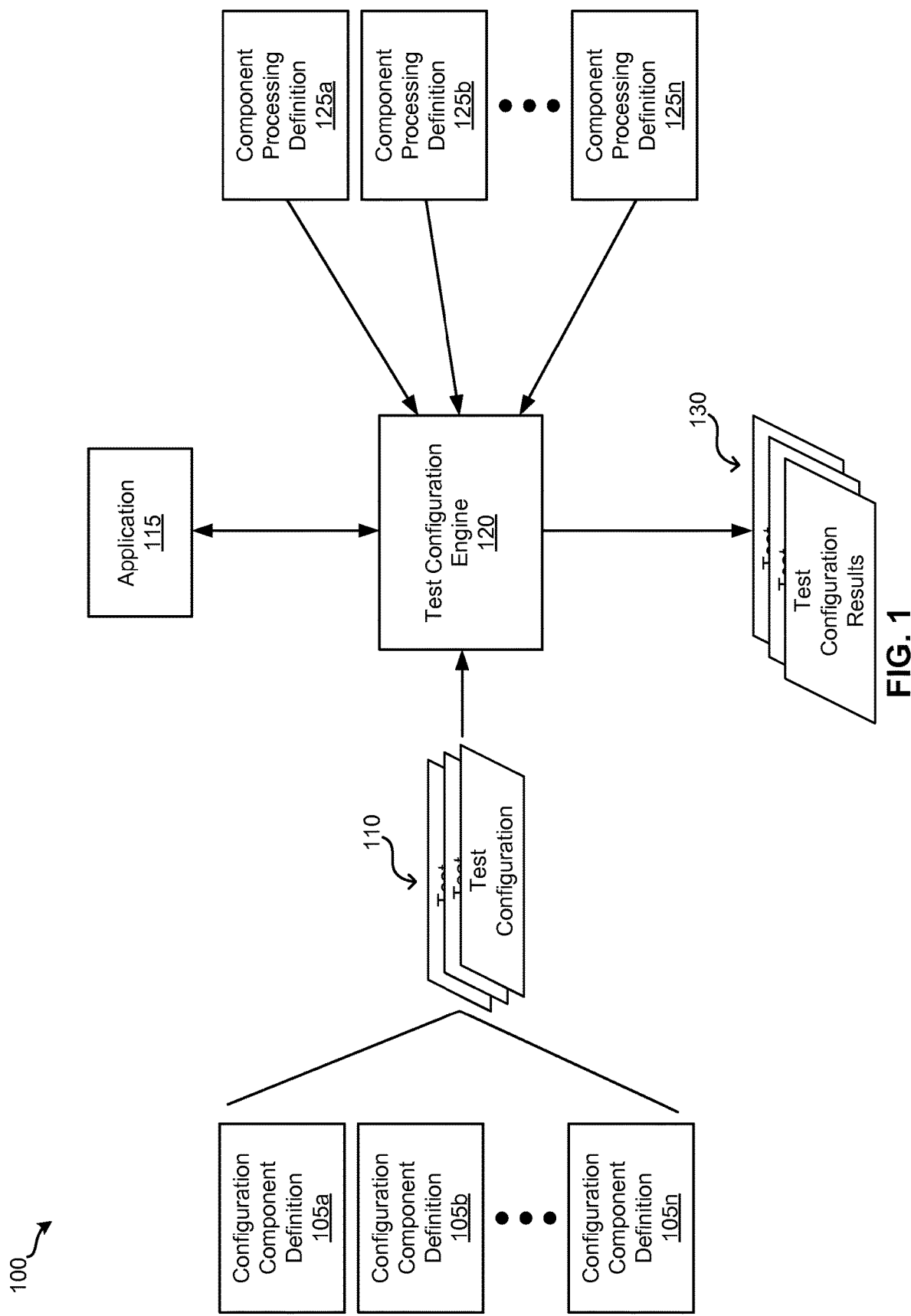
FIG. 1 illustrates a data flow for processing a test configuration according to some embodiments.

FIG. 1 illustrates a data flow 100 for processing a test configuration according to some embodiments. As shown, data flow 100 includes test configurations 110, application 115, test configuration engine 120, component processing definitions 125a-n, and test configuration results 130. Each test configuration 110 specifies a set of operations to perform on application 115. For instance, the set of operations to perform on application 115 may be to perform tests on application 115 for quality assurance purposes. One of ordinary skill in the art will understand that the set of operations to perform on application 115 may be for any number of different purposes. In some embodiments, test configurations 110 are specified using an extensible markup language (XML).

As mentioned above, a test configuration is specified by several configuration components in some embodiments. For this example, each of the test configurations 110 is specified by configuration components defined by configuration component definitions 105a-n. For instance, a test configuration 110 may be specified by configuration components defined by configuration component definitions 105a and 105n. As another example, a test configuration 110 may be specified by configuration components defined by configuration component definitions 105b, 105d, 105f, and 105h. One of ordinary skill in the art will appreciate that different test configurations 110 may be specified by any number of configuration components and any number of different types of configuration components. In some embodiments, a particular type of configuration component may represent an operation to perform on application 115; an object, component, element, module, etc. associated with application 115; or a parameter associated with an operation, object, component, element, module, etc. associated with application 115.

Each type of configuration component may be associated with a corresponding component processor defined by a component processing definition 125 to process the type of configuration component. For this example, a first type of configuration component defined by configuration component definition 105a is associated with a configuration component processor defined by component processing definition 125a to process the first type of configuration components, a second type of configuration component defined by configuration component definition 105b is associated with a configuration component processor defined by component processing definition 125b to process the second type of configuration components, a third type of configuration component defined by configuration component definition 105c is associated with a configuration component processor defined by component processing definition 125c to process the third type of configuration components, etc.

Application 115 may be a desktop application, web application/service, mobile application, etc. In some embodiments, application 115 is an extract, transform, load (ETL) tool (e.g., SAP Data Services, SAP Data Services on Demand (DSoD), etc.) for configuring data transfers from a set of data sources to another set of data sources. Application 115 may be an application for one of any number of different systems (e.g., a human capital management (HCM) system, an enterprise resource planning (ERP) system, a customer relationship management (CRM) system, a supply chain management (SCM) system, a product lifecycle management (PLM) system, etc.). In some embodiments, application 115 and test configuration engine 120 operate on the same computing device. In other embodiments, application 115 and test configuration engine 120 operate on different computing devices. For example, application 115 may be hosted on an application server and test configuration engine 120 may be operating on a desktop or laptop computing device. In some embodiments, application 115 may provide a graphical user interface (GUI), a command line interface (CLI), etc. for interacting with application 115.

Test configuration engine 120 is configured to process test configurations 110 and generate test configuration results 130 based on the processing of test configurations 110. When test configuration engine 120 receives a test configuration 110, test configuration engine 120 interacts with application 115 in the manner specified by the configuration components of the test configuration 110. Test configuration engine 120 outputs the results of the interaction with application 115 in a test configuration results 130.

For a particular test configuration 110, test configuration engine 120 may parse the test configuration 110 and, based on the parsing of the particular test configuration 110, generate an object model (e.g., an XML document object model (DOM)) representation of the particular test configuration 110. In some embodiments, the object model representation of a particular test configuration 110 is a hierarchical tree structure of the configuration components of the particular test configuration 110. An example of an object model representation of a test configuration is described below by reference to FIG. 4.

To process a particular test configuration 110, test configuration engine 120 traverses the object model representation of the particular test configuration 110 to identify a configuration component. Based on the identified configuration component, test configuration engine 120 identifies a corresponding component processing definition 125. Test configuration engine 120 processes the identified configuration component according to the corresponding component processing definition 125. As described above, in some embodiments, a particular type of configuration component may represent an operation to perform on application 115; an object, component, element, module, etc. associated with application 115; or a parameter associated with an operation, object, component, element, module, etc. associated with application 115. In some such embodiments, when test configuration engine 120 processes a particular type of configuration component according to the corresponding component processing definition 125, test configuration engine 120 may perform operations on application 115 and/or access or manipulate objects, components, elements, modules, etc. associated with application 115 based on parameters associated with operations, objects, components, elements, modules, etc. associated with application 115.

Component processing definitions 125a-n define the processing of configuration components. Specifically, each component processing definition 125 defines the processing for a particular type of configuration component. In this example, component processing definition 125a defines processing for a first type of configuration component defined by configuration component definition 105a, component processing definition 125b defines processing for a second type of configuration component defined by configuration component definition 105b, component processing definition 125c defines processing for a third type of configuration component defined by configuration component definition 105c, etc. In some embodiments, each component processing definition 125 is defined by a Java class. One of ordinary skill in the art will recognize that component processing definitions 125a-n may be defined using any number of different programming languages in different embodiments.

Test configuration results 130 stores results associated with a processing of a test configuration 110. For example, a test configuration result 130 may specify success or failure of a test configuration 110 processed by test configuration engine 120. In some embodiments, test configuration results 130 are log files.

Figure 2:
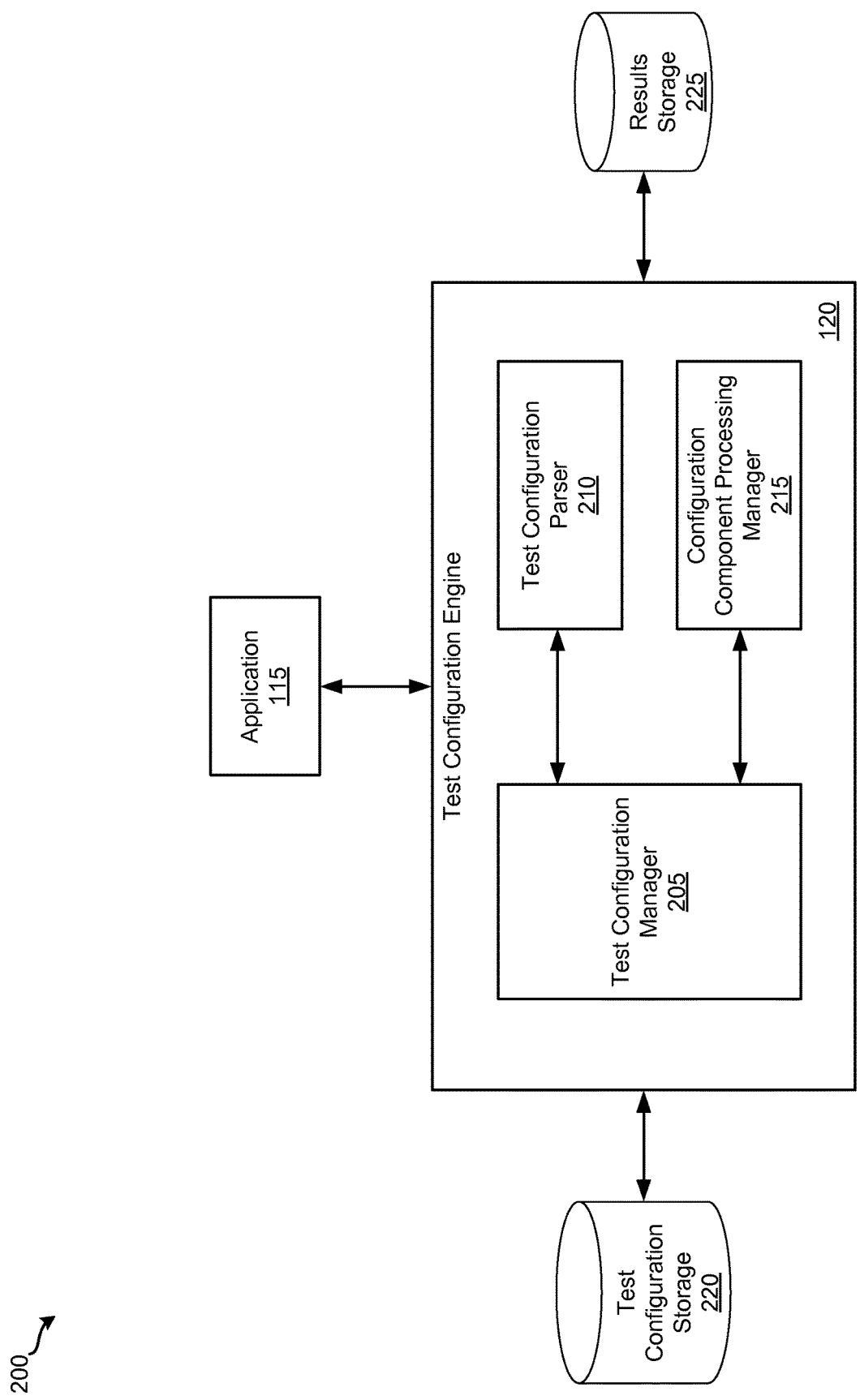
FIG. 2 illustrates a system for processing test configurations according to some embodiments.

FIG. 2 illustrates a system 200 for processing test configurations according to some embodiments. In particular, system 200 is configured to process test configuration in an automated manner. As shown, system 200 includes configuration storage 220, application 115, test configuration engine 120, and results storage 225. Configuration storage 220 is configured to store test configurations (e.g., test configurations 110), component configuration definitions (e.g., component configuration definitions 105a-n), and component processing definitions (e.g., component processing definitions 125a-n). In some embodiments, configuration storage 220 is implemented by one or more data storages (e.g., hard disk storages, flash memory storages, optical disc storages, etc.). Results storage 225 is configured to store test configuration results (e.g., test configuration results 130). In some embodiments, results storage 225 is implemented by one or more data storages (e.g., hard disk storages, flash memory storages, optical disc storages, etc.).

As illustrated in FIG. 2, test configuration engine 120 includes test configuration manager 205, test configuration parser, and configuration component processing manager 215. Test configuration parser 210 handles the parsing of configuration tests. As explained above, in some embodiments, test configurations are specified using XML. In some such embodiments, test configuration parser 210 may parse the XML of a test configuration. Based on the parsing of the XML of a test configuration, test configuration parser 210 may generate an object model (e.g., an XML DOM) representation of the test configuration.

Figure 3:
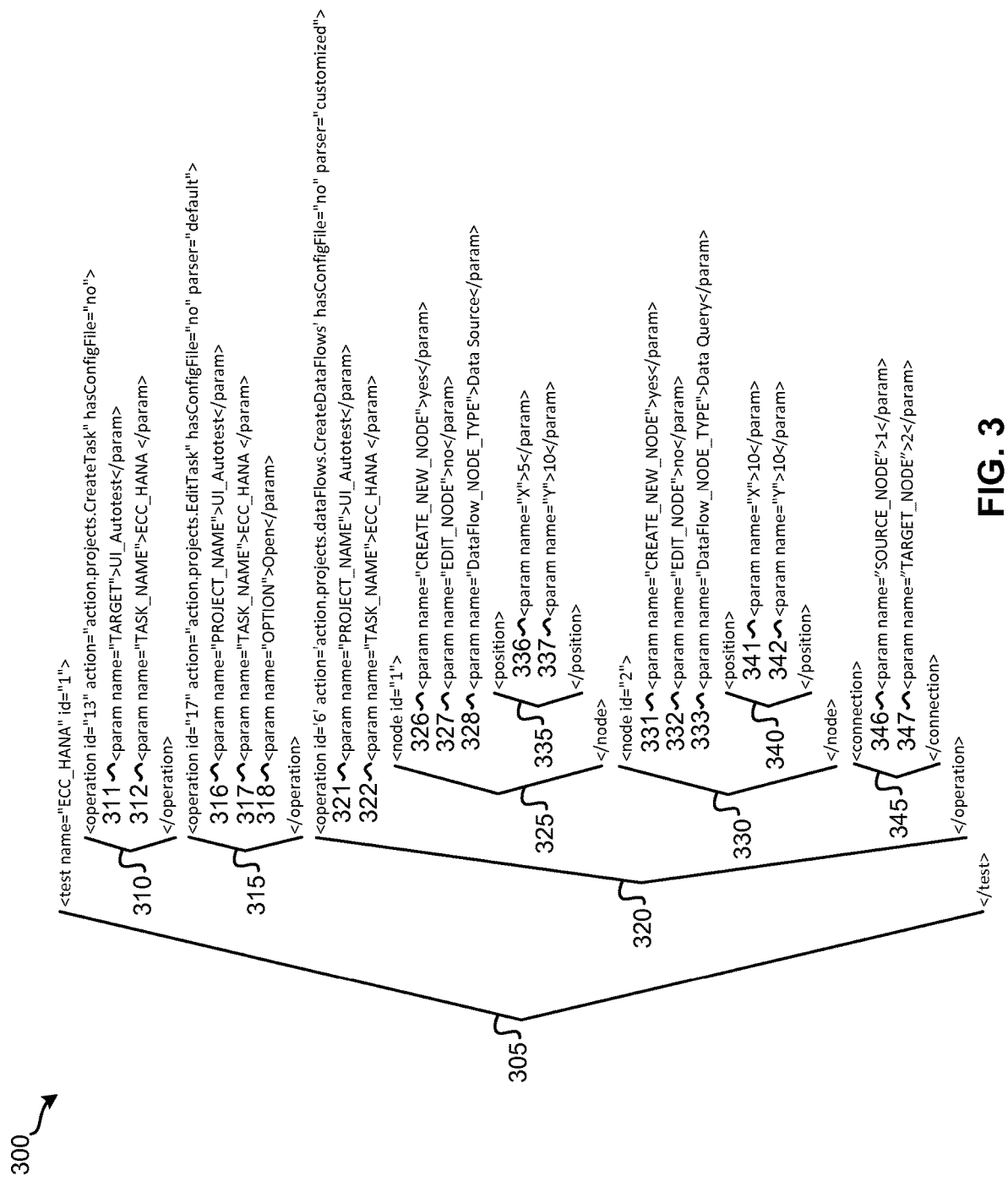
FIG. 3 illustrates a test configuration according to some embodiments.
Figure 5:
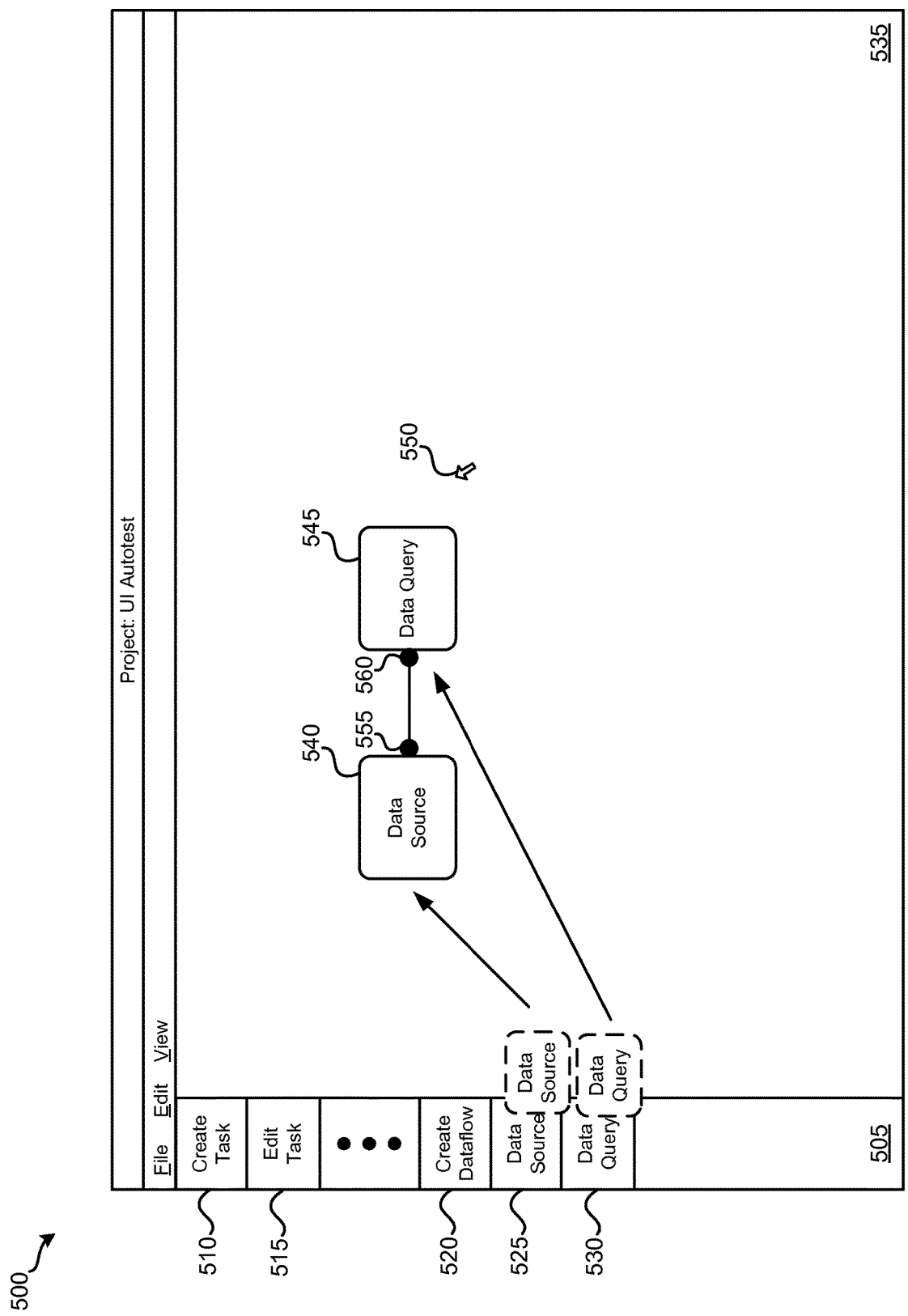
FIG. 5 illustrates a graphical user interface provided by an application according to some embodiments.

FIG. 3 illustrates a test configuration 300 according to some embodiments. As shown, test configuration 300 is specified using XML In this example, test configuration 300 specifies operations to perform on a graphical user interface (GUI) of an application shown in FIG. 5. FIG. 5 illustrates a GUI 500 provided by an application according to some embodiments. In some embodiments, application 115 is an ETL tool that provides GUI 500. For this example, GUI 500 is for creating a data flow for an ETL operation. As shown, GUI 500 includes a panel 505 and a display area 535. Panel 505 includes several selectable user interface (UI) items 510, 515, 520, 525, and 530. Specifically, UI item 510 (e.g., a create task button) is for creating a task, UI item 515 (e.g., an edit task button) is for editing a task, UI item 520 (e.g., a create data flow button) is for creating a data flow, UI item 525 (e.g., a Data Source button) is for adding a data source to a data flow, and UI item 530 (e.g., a query button) is for adding a data query to a data flow. Display area 535 is for displaying data flows. As shown, display area 535 is displaying UI elements 540 and 545. UI element 540 represents a data source in a data flow and UI element 545 represents a data query in the data flow. FIG. 5 shows some UI elements arranged in a certain way for the purposes of simplicity and explanation. One of ordinary skill in the art will appreciate that GUI 500 may include additional and/or different UI elements that are arranged in any number of different ways.

Referring back to FIG. 3, test configuration 300 includes several different types of configuration components: a test configuration component, operation configuration components, parameter configuration components, node configuration components, position configuration components, and a connection configuration component. Each configuration component is specified by opening and closing tags. For example, each parameter configuration component is indicated by a <param> opening tag and </param> closing tag.

Test configuration 300 specifies test configuration component 305, which represents a test to perform on application 115. In this example, the test configuration component 305 includes operation configuration components 310, 315, and 320. Operation configuration component 310 includes parameter configuration components 311 and 312. Parameter configuration component 311 represents a project name ("UI_Autotest" in this example) associated with operation configuration component 310. Parameter configuration component 312 represents a task name ("ECC_HANA" in this example) associated with operation configuration component 310. In this example, operation configuration component 310 represents an operation to select (e.g., using cursor 550) the UI item 510 to create a task named ECC_HANA for a project named UI_Autotest.

Operation configuration component 315 includes parameter configuration components 316, 317 and 318. Parameter configuration component 316 represents a project name ("UI_Autotest" in this example) associated with operation configuration component 315. Parameter configuration component 317 represents a task name ("ECC_HANA" in this example) associated with operation configuration component 315. Parameter configuration component 318 represents an edit operation (an "Open" operation in this example) associated with operation configuration component 315. In this example, operation configuration component 315 represents an operation to select (e.g., using cursor 550) the UI item 515 to open operation on a task named ECC_HANA for a project named UI_Autotest.

Operation configuration component 320 includes parameter configuration components 321, 322 and 323; node configuration components 325 and 330, and connection configuration component 345. Parameter configuration component 321 represents a project name ("UI_Autotest" in this example) associated with operation configuration 320. Parameter configuration component 322 represents a task name ("ECC_HANA" in this example) associated with operation configuration 320.

Node configuration component 325 includes parameter configuration components 326, 327, and 328; and a position configuration component 335. Parameter configuration component 326 represents enabling an option to create a new node associated with node configuration component 325. Parameter configuration component 327 represents disabling an option to edit a node associated with node configuration component 325. Parameter configuration component 328 represents a node type (Data Source in this example) associated with node configuration component 325. Position configuration component 335 includes parameter configuration components 336 and 337. Parameter configuration component 336 represents an x-axis coordinate value (5 in this example) associated with position configuration component 335. Parameter configuration component 337 represents a y-axis coordinate value (10 in this example) value associated with position configuration component 335. For this example, position configuration component 335 represents a position (5, 10) in display area 535 and node configuration component 325 represents creating a data source node for a data flow at position (5, 10) in display area 535.

Node configuration component 330 includes parameter configuration components 331, 332, and 333; and a position configuration component 340. Parameter configuration component 331 represents enabling an option to create a new node associated with node configuration component 330. Parameter configuration component 332 represents disabling an option to edit a node associated with node configuration component 330. Parameter configuration component 333 represents a node type (Data Query in this example) associated with node configuration component 330. Position configuration component 340 includes parameter configuration components 341 and 342. Parameter configuration component 341 represents an x-axis coordinate value (10 in this example) associated with position configuration component 340. Parameter configuration component 342 represents a y-axis coordinate value (10 in this example) value associated with position configuration component 340. In this example, position configuration component 340 represents a position (10, 10) in display area 535 and node configuration component 325 represents creating a data query node for a data flow at position (10, 10) in display area 535.

Connection configuration component 445 includes parameter configuration components 446 and 447. Parameter configuration component 446 represents a source node (the data source node) of a connection in a data flow. Parameter configuration component 447 represents a target node (the data query node in this example) of the connection in the data flow. For this example, connection configuration component 445 represents creating a connection from the data source node to the data query node for a data flow in display area 535. Finally, operation configuration component 330 represents an operation on a task named ECC_HANA for a project named UI_Autotest. The operation includes selecting the UI item 520 to create a data flow, adding a data source node to the data flow by selecting and dragging (e.g., using cursor 550) UI item 525 to position (5, 10) in display area 535, adding a data query node to the data flow by selecting and dragging (e.g., using cursor 550) UI item 530 to position (10, 10) in display area 535, and adding a connection between the data source node and the data query node by selecting and dragging (e.g., using cursor 550) UI element 555 to UI element 560 in display area 535.

Figure 4:
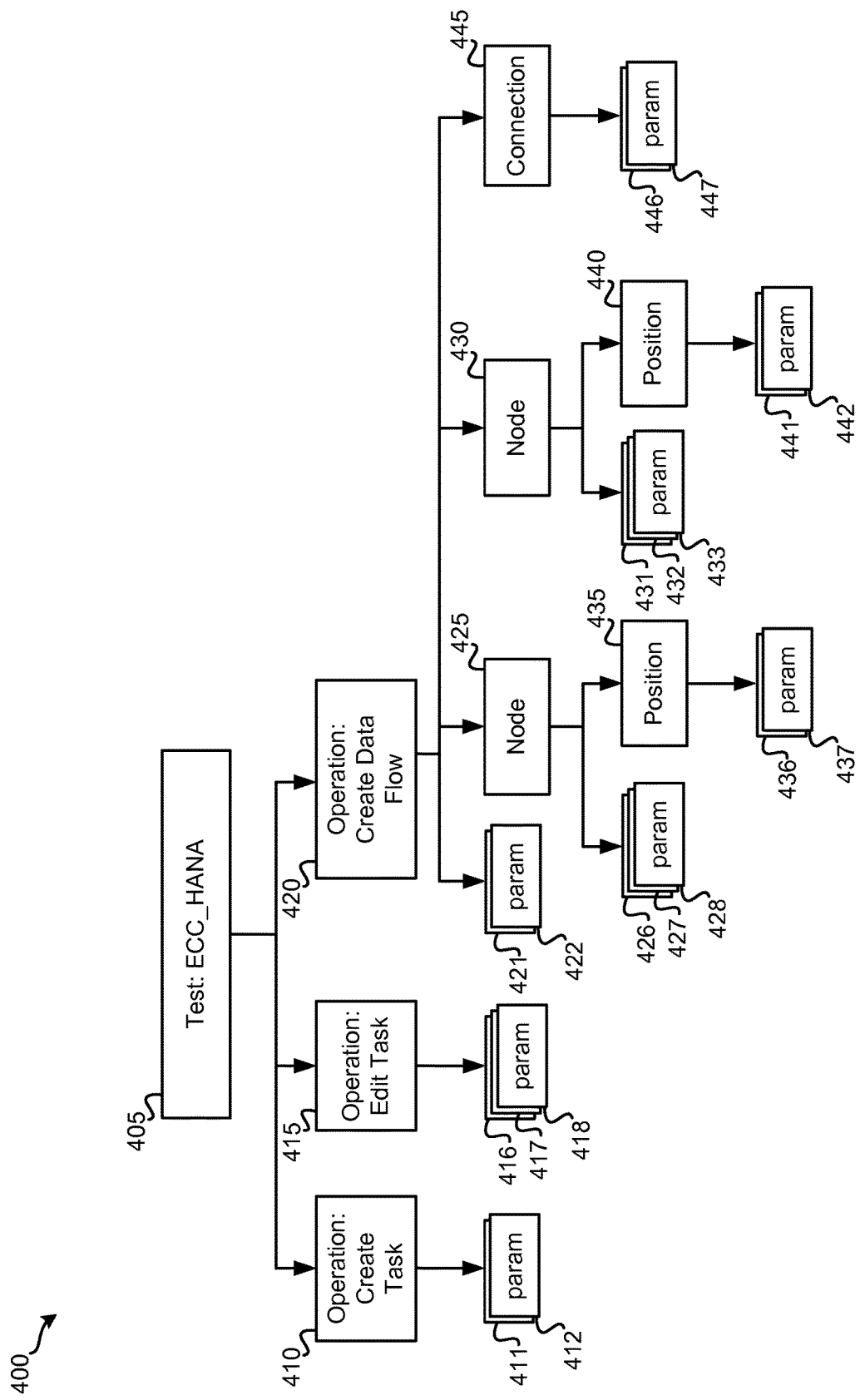
FIG. 4 illustrates a representation of configuration components in a test configuration according to some embodiments.

As explained above, test configuration parser 210 may generate an object model (e.g., an XML DOM) representation of a test configuration based on the parsing of the XML of a test configuration. FIG. 4 illustrates a representation 400 of configuration components in a test configuration according to some embodiments. Specifically, representation 400 is an object model (e.g., an XML DOM) representation of test configuration 300 shown in FIG. 3. As illustrated in FIG. 4, representation 400 is a hierarchical tree structure of the configuration components of test configuration 300. Specifically, representation 400 includes nodes 405, 410, 411, 412, 415, 416, 417, 418, 420, 421, 422, 425, 426, 427, 428, 430, 431, 432, 433, 435, 436, 437, 440, 441, 442, 445, 446, and 447. Node 405 corresponds to test configuration component 305. Node 410 corresponds to operation configuration component 310. Nodes 411 and 412 correspond to parameter configuration components 311 and 312. Node 415 corresponds to operation configuration component 315. Nodes 416, 417, and 418 correspond to parameter configuration components 316, 317, and 318. Node 420 corresponds to operation configuration component 320. Nodes 421 and 422 correspond to parameter configuration components 321 and 322. Node 425 corresponds to node configuration component 325. Nodes 426, 427, and 428 correspond to parameter configuration components 326, 327, and 328. Node 435 corresponds to position configuration component 335. Nodes 436 and 437 correspond to parameter configuration components 336 and 337. Node 430 corresponds to node configuration component 330. Nodes 431, 432, and 433 correspond to parameter configuration components 331, 332, and 333. Node 440 corresponds to position configuration component 340. Nodes 441 and 442 correspond to parameter configuration components 341 and 342. Node 445 corresponds to connection configuration component 345. Nodes 446 and 447 correspond to parameter configuration components 346 and 347.

Referring back to FIG. 2, test configuration manager 205 manages the processing of test configurations. In some embodiments, test configuration manager 205 processes a set of test configurations that are specified in a batch file. This way, different sets of test configurations may be processed based on different batch files. When test configuration manager 205 receives a batch file, test configuration manager 205 iteratively processes each test configuration specified in the batch file. To process a test configuration, test configuration manager 205 retrieves the test configuration from test configuration storage 220. Test configuration manager 205 then sends the test configuration to test configuration parser 210 for parsing. In response, test configuration manager 205 receives an object model representation of the test configuration from test configuration parser 210.

Test configuration manager 205 may traverse the object model representation of the test configuration to identify a configuration component. As mentioned above, in some embodiments, the object model representation of a test configuration is a hierarchical tree structure of the configuration components of the test configuration. In some such embodiments, test configuration manager 205 traverses the object model representation according to a depth-first methodology. Referring to FIG. 4 as an example, test configuration manager 205 may traverse the nodes in representation 400 according to the following order: 411, 412, 410, 416, 417, 418, 415, 421, 422, 426, 427, 428, 436, 437, 435, 425, 431, 432, 433, 441, 442, 440, 430, 446, 447, 445, 420, and 405.

Test configuration manager 205 sends the identified configuration component (e.g., an XML representation of the configuration component) to configuration component processing manager 215 for processing. In response, test configuration manager 205 receives from configuration component processing manager 215 results of the processing of the configuration component. Test configuration manager 205 continues to iteratively traverse the object model representation of the test configuration and send configuration components to configuration component processing manager 215 for processing until test configuration manager 205 has traversed the entire object model representation of the test configuration. Test configuration manager 205 stores the results of the processing of the test configuration in results storage 225. In some embodiments, the results of the processing of the test configuration indicates success or failure on a test-by-test basis, an operation-by-operation basis, a configuration component-by-configuration component basis, or a combination thereof.

Configuration component processing manager 215 is responsible for processing configuration components. As described above, each type of configuration component may be associated with a corresponding component processor defined by a component processing definition to process the type of configuration component. In this example, test configuration components are associated with a test configuration component processor configured to process test configuration components, operation configuration components are associated with an operation configuration component processor configured to process operation configuration components, parameter configuration components are associated with a parameter configuration component processor configured to process parameter configuration components, node configuration components are associated with a node configuration component processor configured to process node configuration components, position configuration components are associated with a position configuration component processor configured to process position configuration components, and connection configuration components are associated with a connection configuration component processor configured to process connection configuration components.

Configuration component processing manager 215 processes a configuration component by determining the type of the configuration component. Referring to FIG. 3 as an example, when configuration component processing manager 215 receives an XML representation of the configuration component, configuration component processing manager 215 determines the type of configuration based on the opening and closing tags of the XML. For instance, configuration component processing manager 215 may determine that operation configuration component 310 is an operation configuration component based on the <operation> and </operation> tags in the XML representation of the configuration component. Configuration component processing manager 215 then identifies a corresponding configuration component processor to process the configuration component based on the determined type of the configuration component. Configuration component processing manager 215 uses the identified configuration component processor to process the XML representation of the configuration component.

Referring to FIGS. 3-5 as an example, FIG. 5 shows GUI 500 after test configuration engine 120 traverses representation 400 of test configuration 300 to process the configuration components of test configuration 300 and interact with application 115 according to the processing of test configuration 300. Specifically, FIG. 5 shows GUI 500 after test configuration engine 120 selects (e.g., using cursor 550) the UI item 510 to create a task named ECC_HANA for a project named UI_Autotest, selects (e.g., using cursor 550) the UI item 515 to open operation on a task named ECC_HANA for a project named UI_Autotest, selects (e.g., using cursor 550) the UI item 520 to create a data flow, adds a data source node to the data flow by selecting and dragging (e.g., using cursor 550) UI item 525 to position (5, 10) in display area 535, adds a data query node to the data flow by selecting and dragging (e.g., using cursor 550) UI item 530 to position (10, 10) in display area 535, and adds a connection between the data source node and the data query node by selecting and dragging (e.g., using cursor 550) UI element 555 to UI element 560 in display area 535. In some embodiments, test configuration engine 120 interacts with GUI 500 via a GUI automation tool.

Figure 6:
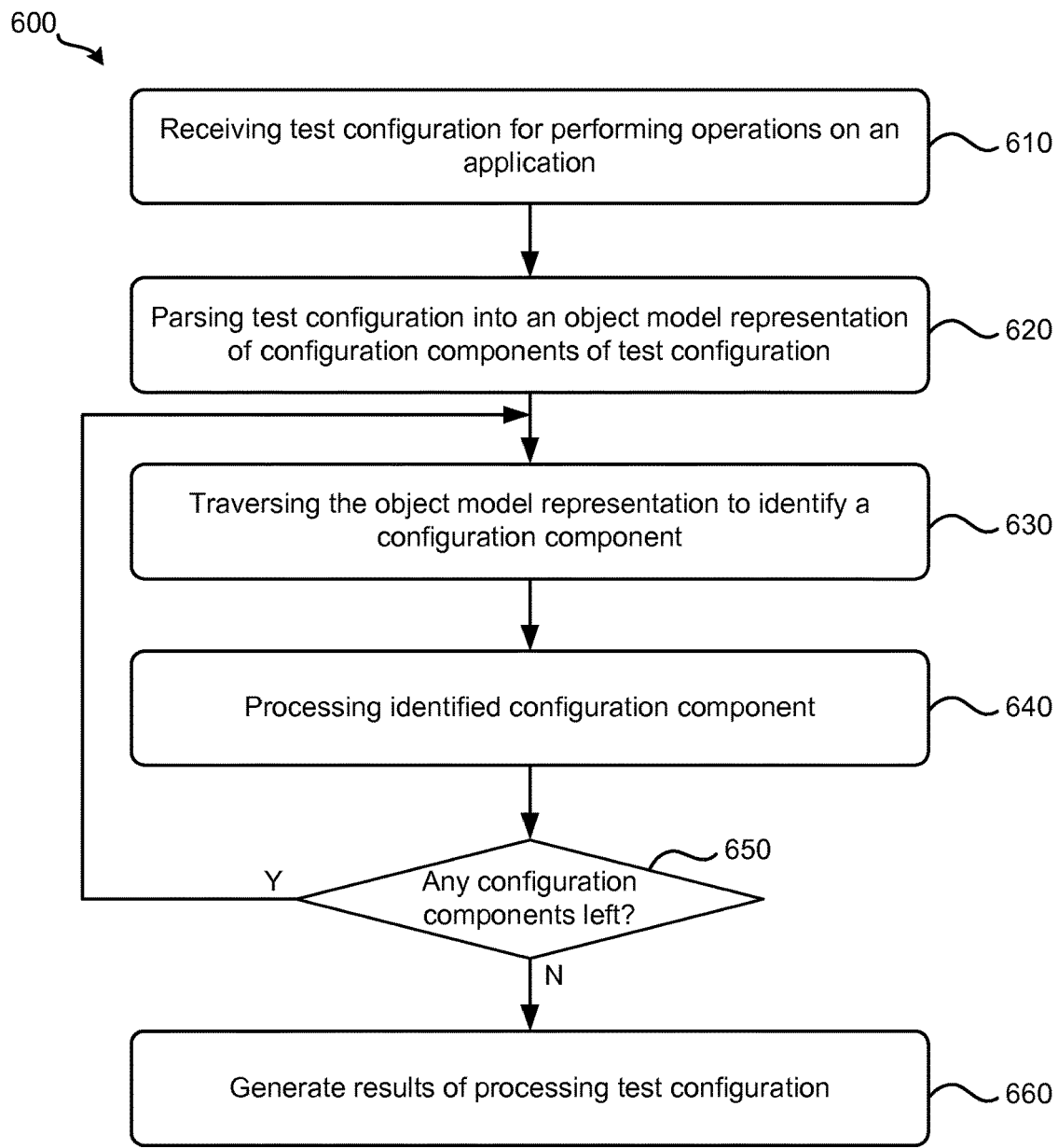
FIG. 6 illustrates a process for processing a test configuration according to some embodiments.

FIG. 6 illustrates a process 600 for processing a test configuration according to some embodiments. In some embodiments, a test configuration engine (e.g., test configuration engine 120) performs the operations of process 600. As mentioned above, in some embodiments, a set of test configurations may be specified in a batch file. In some such embodiments, test configuration engine 120 performs process 600 for each test configuration specified in the batch file.

Process 600 starts by receiving, at 610, a test configuration for performing operations on an application. As described above, a test configuration may be specified by any number of configuration components and any number of different types of configuration components. In some embodiments, process 600 receives the test configuration by retrieving the test configuration from a data storage (e.g., test configuration storage 220).

Next, process 600 parses, at 620, the test configuration into an object model representation of the configuration components of the test configuration. As mentioned above, in some embodiments, the object model representation of the configuration components of the test configuration is a hierarchical tree structure of the configuration components of the test configuration.

Process 600 then traverses, at 630, the object model representation of the test configuration in order to identify a configuration component. In some embodiments, process 600 traverses the object model representation according to a depth-first methodology. Referring to FIG. 4 as an example, process 600 may traverse the nodes in representation 400 according to the following order: 411, 412, 410, 416, 417, 418, 415, 421, 422, 426, 427, 428, 436, 437, 435, 425, 431, 432, 433, 441, 442, 440, 430, 446, 447, 445, 420, and 405.

Next, process 600 processes, at 640, the identified configuration component. In some embodiments, process 600 processes the identified configuration component by determining the type of the configuration component. Referring to FIG. 3 as an example, process 600 may receive an XML representation of the configuration component. In this example, process 600 may determine the type of configuration based on the opening and closing tags of the XML. For instance, process 600 may determine that operation configuration component 310 is an operation configuration component based on the <operation> and </operation> tags in the XML representation of the configuration component. As explained above, each type of configuration component may be associated with a corresponding component processor defined by a component processing definition to process the type of configuration component. As such, process 600 identifies a corresponding configuration component processor to process the configuration component based on the determined type of the configuration component. Process 600 uses the identified configuration component processor to process the XML representation of the configuration component.

In some instances, process 600 interacts with the application based on the processing of the configuration component. Referring to FIG. 3 as an example, process 600 interacts with GUI 500 when process 600 processes operation configuration components 310, 315, and 320. Specifically, in such an example, process 600 selects (e.g., using cursor 550) the UI item 510 to create a task named ECC_HANA for a project named UI_Autotest, selects (e.g., using cursor 550) the UI item 515 to open operation on a task named ECC_HANA for a project named UI_Autotest, selects (e.g., using cursor 550) the UI item 520 to create a data flow, adds a data source node to the data flow by selecting and dragging (e.g., using cursor 550) UI item 525 to position (5, 10) in display area 535, adds a data query node to the data flow by selecting and dragging (e.g., using cursor 550) UI item 530 to position (10, 10) in display area 535, and adds a connection between the data source node and the data query node by selecting and dragging (e.g., using cursor 550) UI element 555 to UI element 560 in display area 535.

Process 600 then determines, at 650, whether any configuration components are left to process. If process 600 determines that there are configuration components left to process (e.g., process 600 has not completed traversing the object model representation of the test configuration), process 600 returns to 630 to continue processing configuration components. Otherwise, process 600 proceeds to 660.

At 660, process 600 generates results of processing the test configuration. In some embodiments, the results of the processing of the test configuration indicates success or failure on a test-by-test basis, an operation-by-operation basis, a configuration component-by-configuration component basis, or a combination thereof. Process 600 may store (e.g., in results storage 225) the results of the processing of the test configuration in some embodiments.

FIGS. 1-6 describe processing different test configurations for performing different operations on an application in order to run tests on the application. One of ordinary skill in the art will understand that the same and/or similar techniques may be used for processing different types of configurations in different embodiments. For instance, different configurations (e.g., specified using different types of configuration components) may be processed for building/displaying different elements for GUIs, different configurations (e.g., specified using different types of configuration components) may be processed for performing operations on different system components (e.g., in order to run different tests on the system components), different configurations (e.g., specified using different types of configuration components) may be processed for creating different database configurations, etc.

Figure 7:
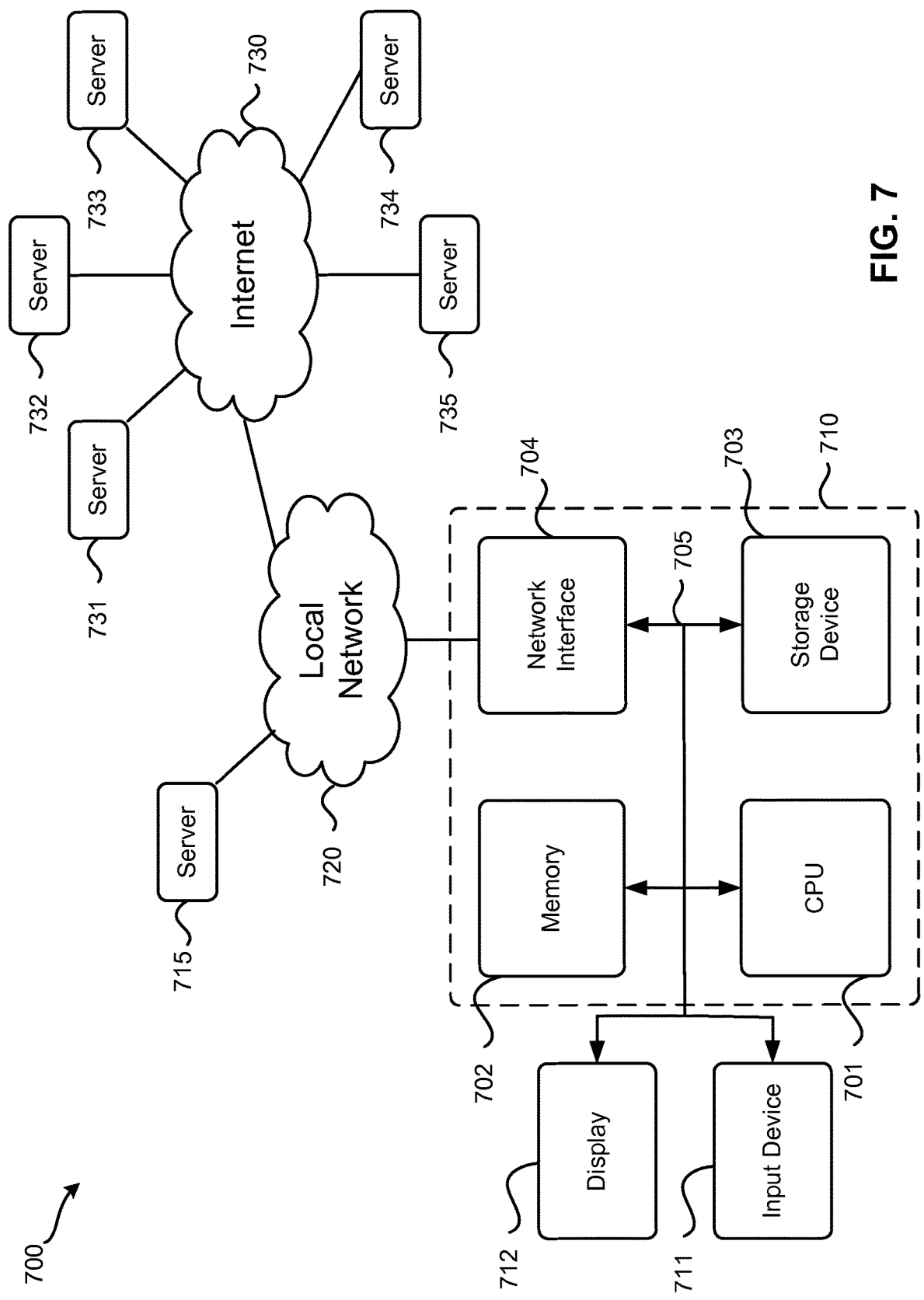
FIG. 7 illustrates an exemplary computer system according to some embodiments.

An exemplary computer system 700 is illustrated in FIG. 7. Computer system 710 includes a bus 705 or other communication mechanism for communicating information, and a processor 701 coupled with bus 705 for processing information. Computer system 710 also includes memory 702 coupled to bus 705 for storing information and instructions to be executed by processor 701, including information and instructions for performing the techniques described above, for example. This memory may also be used for storing variables or other intermediate information during execution of instructions to be executed by processor 701. Possible implementations of this memory may be, but are not limited to, random access memory (RAM), read only memory (ROM), or both. A storage device 703 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 703 may include source code, binary code, or software files for performing the techniques above, for example. Storage device and memory are both examples of computer readable mediums.

Computer system 710 may be coupled via bus 705 to a display 712, such as a cathode ray tube (CRT) or liquid crystal display (LCD), for displaying information to a computer user. An input device 711 such as a keyboard and/or mouse is coupled to bus 705 for communicating information and command selections from the user to processor 701. The combination of these components allows the user to communicate with the system. In some systems, bus 705 may be divided into multiple specialized buses.

Computer system 710 also includes a network interface 704 coupled with bus 705. Network interface 704 may provide two-way data communication between computer system 710 and the local network 720. The network interface 704 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 704 sends and receives electrical, electromagnetic, or optical signals that carry digital data streams representing various types of information.

Computer system 710 can send and receive information, including messages or other interface actions, through the network interface 704 across a local network 720, an Intranet, or the Internet 730. For a local network, computer system 710 may communicate with a plurality of other computer machines, such as server 715. Accordingly, computer system 710 and server computer systems represented by server 715 may form a cloud computing network, which may be programmed with processes described herein. In the Internet example, software components or services may reside on multiple different computer systems 710 or servers 731-735 across the network. The processes described above may be implemented on one or more servers, for example. A server 731 may transmit actions or messages from one component, through Internet 730, local network 720, and network interface 704 to a component on computer system 710. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A non-transitory machine-readable medium storing a program executable by at least one processing unit of a device, the program comprising sets of instructions for:

receiving a first test configuration for testing operation of an application, the first test configuration comprising a first configuration component having a first type and a second configuration component having a second type, wherein the first configuration component represents a first set of operations to perform on the application, wherein the second configuration component represents a second set of operations to perform on the application;

performing the first set of operations on the application by traversing through a first hierarchical tree structure of configuration components to identify the first configuration component, identifying a first configuration component processor from a plurality of configuration component processors based on the first type of the first configuration component, and processing the first configuration component using the first configuration component processor;

performing the second set of operations on the application by traversing through the first hierarchical tree structure of configuration components to identify the second configuration component, identifying a second configuration component processor from the plurality of configuration component processors based on the second type of the second configuration component, and processing the second configuration component using the second configuration component processor;

receiving a second test configuration for testing operation of the application, the second test configuration comprising a third configuration component having the first type and a fourth configuration component having a third type, wherein the third configuration component represents a third set of operations to perform on the application, wherein the fourth configuration component represents a fourth set of operations to perform on the application;

performing the third set of operations on the application by traversing through a second hierarchical tree structure of configuration components to identify the third configuration component, identifying the first configuration component processor from the plurality of configuration component processors based on the first type of the third configuration component, and processing the third configuration component using the first configuration component processor; and performing the fourth set of operations on the application by traversing through the second hierarchical tree structure of configuration components to identify the fourth configuration component, identifying a third configuration component processor from the plurality of configuration component processors based on the third type of the fourth configuration component, and processing the fourth configuration component using the third configuration component processor.

2. The non-transitory machine-readable medium of claim 1, wherein the program further comprises sets of instructions for:

parsing the first test configuration;

based on the parsed first test configuration, generating a first object model representation of the first test configuration comprising the first hierarchical tree structure of configuration components that includes the first and second configuration components;

parsing the second test configuration; and based on the parsed second test configuration, generating a second object model representation of the second test configuration comprising the second hierarchical tree structure of configuration components that includes the third and fourth configuration components.

3. The non-transitory machine-readable medium of claim 2, wherein performing the first set of operations on the application is further by determining that the first configuration component processor is associated with the first configuration component based on the first type of the first configuration component, wherein performing the second set of operations on the application is further by determining that the second configuration component processor is associated with the second configuration component based on the second type of the second configuration component, wherein performing the third set of operations on the application is further by determining that the first configuration component processor is associated with the third configuration component based on the first type of the third configuration component, and wherein performing the fourth set of operations on the application is further by determining that the third configuration component processor is associated with the fourth configuration component based on the third type of the fourth configuration component.

4. The non-transitory machine-readable medium of claim 1, wherein the program further comprises sets of instructions for:

generating first results of the processing of the first test configuration; and generating second results of the processing of the second test configuration.

5. The non-transitory machine-readable medium of claim 4, wherein receiving the first test configuration comprises retrieving the first test configuration from a first storage, wherein receiving the second test configuration comprises retrieving the second test configuration from the first storage, wherein the program further comprises set of instructions for:

storing the first results of the processing of the first test configuration in a second storage; and storing the second results of the processing of the second test configuration in the second storage.

6. The non-transitory machine-readable medium of claim 1, wherein the application is configurable to provide a graphical user interface comprising a set of selectable UI items, wherein performing the first set of operations on the application comprises performing selecting a UI item in the set of selectable UI items.

7. The non-transitory machine-readable medium of claim 1, wherein the set of instructions for performing the first and second sets of operations on the application comprises a set of instructions for performing the first and second sets of operations through a graphical user interface (GUI) provided by the application.

8. A method comprising:

receiving a first test configuration for testing operation of an application, the first test configuration comprising a first configuration component having a first type and a second configuration component having a second type, wherein the first configuration component represents a first set of operations to perform on the application, wherein the second configuration component represents a second set of operations to perform on the application;

performing the first set of operations on the application by traversing through a first hierarchical tree structure of configuration components to identify the first configuration component, identifying a first configuration component processor from a plurality of configuration component processors based on the first type of the first configuration component, and processing the first configuration component using the first configuration component processor;

performing the first set of operations on the application by traversing through the first hierarchical tree structure of configuration components to identify the second configuration component, identifying a second configuration component processor from the plurality of configuration component processors based on the second type of the second configuration component, and processing the second configuration component using the second configuration component processor;

receiving a second test configuration for testing operation of the application, the second test configuration comprising a third configuration component having the first type and a fourth configuration component having a third type, wherein the third configuration component represents a third set of operations to perform on the application, wherein the fourth configuration component represents a fourth set of operations to perform on the application;

performing the third set of operations on the application by traversing through a second hierarchical tree structure of configuration components to identify the third configuration component, identifying the first configuration component processor from the plurality of configuration component processors based on the first type of the third configuration component, and processing the third configuration component using the first configuration component processor; and performing the fourth set of operations on the application by traversing through the second hierarchical tree structure of configuration components to identify the fourth configuration component, identifying a third configuration component processor from the plurality of configuration component processors based on the third type of the fourth configuration component, and processing the fourth configuration component using the third configuration component processor.

9. The method of claim 8 further comprising:

parsing the first test configuration;

based on the parsed first test configuration, generating a first object model representation of the first test configuration comprising the first hierarchical tree structure of configuration components that includes the first and second configuration components;

parsing the second test configuration; and based on the parsed second test configuration, generating a second object model representation of the first second test configuration comprising the second hierarchical tree structure of configuration components that includes the third and fourth configuration components.

10. The method of claim 9, wherein performing the first set of operations on the application is further by determining that the first configuration component processor is associated with the first configuration component based on the first type of the first configuration component, wherein performing the second set of operations on the application is further by determining that the second configuration component processor is associated with the second configuration component based on the second type of the second configuration component, wherein performing the third set of operations on the application is further by determining that the first configuration component processor is associated with the third configuration component based on the first type of the third configuration component, and wherein performing the fourth set of operations on the application is further by determining that the third configuration component processor is associated with the fourth configuration component based on the third type of the fourth configuration component.

11. The method of claim 8 further comprising:

generating first results of the processing of the first test configuration; and generating second results of the processing of the second test configuration.

12. The method of claim 10, wherein receiving the first test configuration comprises retrieving the first test configuration from a first storage, wherein receiving the second test configuration comprises retrieving the second test configuration from the first storage, wherein the method further comprises:

storing the first results of the processing of the first test configuration in a second storage; and storing the second results of the processing of the second test configuration in the second storage.

13. The method of claim 8, wherein performing the first set of operations, the second set of operations, the third set of operations, and the fourth set of operations on the application comprises performing the first set of operations, the second set of operations, the third set of operations, and the fourth set of operations on the application in an automated manner without human intervention.

14. The method of claim 8, wherein performing the first and second sets of operations on the application comprises performing the first and second sets of operations through a graphical user interface (GUI) provided by the application.

15. A system comprising:
a set of processing units; and
a non-transitory computer-readable medium storing instructions that when executed by at least one processing unit in the set of processing units cause the at least one processing unit to:
receive a first test configuration for testing operation of an application, the first test configuration comprising a first configuration component having a first type and a second configuration component having a second type, wherein the first configuration component represents a first set of operations to perform on the application, wherein the second configuration component represents a second set of operations to perform on the application;
perform the first set of operations on the application by traversing through a first hierarchical tree structure of configuration components to identify the first configuration component, identifying a first configuration component processor from a plurality of configuration component processors based on the first type of the first configuration component, and processing the first configuration component using the first configuration component processor;
perform the second set of operations on the application by traversing through the first hierarchical tree structure of configuration components to identify the second configuration component, identifying a second configuration component processor from the plurality of configuration component processors based on the second type of the second configuration component, and processing the second configuration component using the second configuration component processor;
receive a second test configuration for testing operation of the application, the second test configuration comprising a third configuration component having the first type and a fourth configuration component having a third type, wherein the third configuration component represents a third set of operations to perform on the application, wherein the fourth configuration component represents a fourth set of operations to perform on the application;
perform the third set of operations on the application by traversing through a second hierarchical tree structure of configuration components to identify the third configuration component, identifying the first configuration component processor from the plurality of configuration component processors based on the first type of the third configuration component, and processing the third configuration component using the first configuration component processor; and
perform the fourth set of operations on the application by traversing through the second hierarchical tree structure of configuration components to identify the fourth configuration component, identifying a third configuration component processor from the plurality of configuration component processors based on the third type of the fourth configuration component, and processing the fourth configuration component using the third configuration component processor.

16. The system of claim 15, wherein the instructions further cause the at least one processing unit to:
parse the first test configuration;
based on the parsed first test configuration, generate a first object model representation of the first test configuration comprising the first hierarchical tree structure of configuration components that includes the first and second configuration components;
parse the second test configuration; and
based on the parsed second test configuration, generate a second object model representation of the first second test configuration comprising the second hierarchical tree structure of configuration components that includes the third and fourth configuration components.

17. The system of claim 16, wherein performing the first set of operations on the application is further by determining that the first configuration component processor is associated with the first configuration component based on the first type of the first configuration component, wherein performing the second set of operations on the application is further by determining that the second configuration component processor is associated with the second configuration component based on the second type of the second configuration component, wherein performing the third set of operations on the application is further by determining that the first configuration component processor is associated with the third configuration component based on the first type of the third configuration component, and wherein performing the fourth set of operations on the application is further by determining that the third configuration component processor is associated with the fourth configuration component based on the third type of the fourth configuration component.

18. The system of claim 15, wherein the instructions further cause the at least one processing unit to:
generate first results of the processing of the first test configuration; and
generate second results of the processing of the second test configuration.

19. The system of claim 18, wherein receiving the first test configuration comprises retrieving the first test configuration from a first storage, wherein receiving the second test configuration comprises retrieving the second test configuration from the first storage, wherein the instructions further cause the at least one processing unit to:
store the first results of the processing of the first test configuration in a second storage; and
store the second results of the processing of the second test configuration in the second storage.

20. The system of claim 15, wherein traversing through the first hierarchical tree structure of configuration components to identify the first configuration component and the second configuration component comprises traversing through the first hierarchical tree structure of configuration components using a depth-first methodology, wherein traversing through the second hierarchical tree structure of configuration components to identify the third configuration component and the fourth configuration component comprises traversing through the first hierarchical tree structure of configuration components using the depth-first methodology.

* * * * *